UNITED STATES PATENT OFFICE.

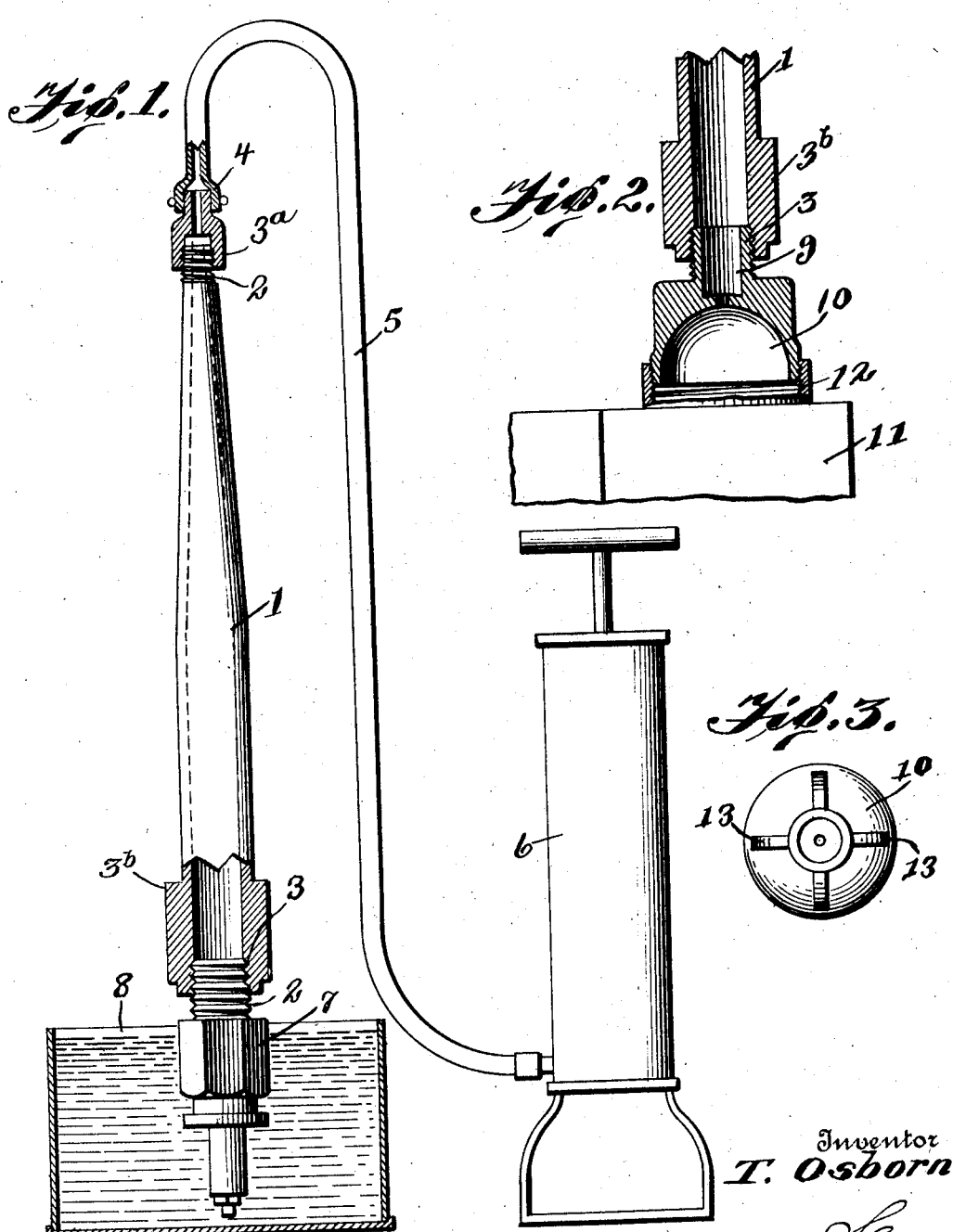

THOMAS OSBORN, OF MOUNT PLEASANT, IOWA.

SPARK-PLUG OR RADIATOR LEAK FINDER.

1,335,073.　　　Specification of Letters Patent.　　Patented Mar. 30, 1920.

Application filed March 6, 1919. Serial No. 280,990.

*To all whom it may concern:*

Be it known that I, (Rev.) THOMAS OSBORN, citizen of the United States, residing at Mount Pleasant, in the county of Henry and State of Iowa, have invented certain new and useful Improvements in Spark-Plug or Radiator Leak Finders, of which the following is a specification, reference being had therein to the accompanying drawings.

This invention relates to a spark plug or radiator leak detector and has for its object the production of a simple and efficient means for attaching an air forcing means to a radiator or spark plug for permitting a leak to be determined by the escapement of air therefrom.

Other objects and advantages of the present invention will appear throughout the following specification and claim.

In the drawings:

Figure 1 is a vertical section through the tester shown attached to a spark plug.

Fig. 2 is a vertical section through the radiator leak detector shown connected to a radiator cap.

Fig. 3 is a top plan view of the radiator cap shown in Fig. 2.

Referring to the drawings by numerals, 1 designates the elongated, tapering tube of the finder or detector, which tube is provided with an externally-threaded end 2 and an internally-threaded end 3. A nipple 4 is attached by fastening means to the outer end of cap 3ᵃ, the cap 3ᵃ being threaded upon the threaded end 2 of the comparatively long tube 1. The nipple 4 is integral with a flexible tube 5, which tube 5 is connected to pump 6. It will, therefore, be understood that when it is desired to test a spark plug or a radiator in order to determine whether or not the same is leaking, it will only be necessary to attach the lower threaded end 3 of the device to the spark plug or radiator top connection with a view to forcing air into this plug or the radiator by means of pump 6, as will be hereinafter more specifically explained.

The lower or inner end of elongated tube 1 is enlarged at 3ᵇ, to provide efficient means to be gripped by hand or wrench, without injuring the tube, to allow the device to be more readily turned upon or removed from a spark plug or a radiator. In Fig. 1, the spark plug 7 is threaded into the threaded portion 3 of the enlarged end of tube 1, and then the plug is placed in the tank 8 preferably filled with water. Upon forcing air into the spark plug by means of the pump 6, if the plug is leaking, the air escaping from the plug will rise to the surface of the water within the tank 8, in the form of bubbles.

In the modification shown in Fig. 2, the internally-threaded portion 3 of tube 1 is threaded upon the threaded end 9 of the detachable radiator cap 10; then the cap 10 is threaded into the collar 12 of the radiator 11, and upon air being forced through tube 1, the water in the radiator will be forced in a stream through the leaking portion thereof, thereby permitting the point of leakage to be determined.

The cap 10 is provided with suitable fingers 13 (Fig. 3) upon the top thereof, to permit the cap to be threaded into or upon the collar 12.

What I claim is:

In a device of the class described, the combination with a pump and a spark plug, of a leak finder tube comprising a body provided at its outer end with external threads, said body provided at its inner end with internal screw threads, said inner end threaded upon said spark plug, a flexible tube attached at one end to said pump and provided at its other end with a nipple, a cap attached to said nipple, and said cap threaded upon the outer end of said tube, substantially as shown and described.

In testimony whereof I hereunto affix my signature.

THOMAS OSBORN.